United States Patent [19]
Krauss et al.

[11] Patent Number: 5,259,638
[45] Date of Patent: Nov. 9, 1993

[54] DEVICE FOR FACILITATING TEACHING YOUNGSTERS TO RIDE BICYCLES

[76] Inventors: Marc Krauss, 365 Sutton Pl.; Gerald Rich, 302 Howard Ave., both of, Woodmere, N.Y. 11598; Moishe Geller, 108 S. Gate Dr., Spring Valley, N.Y. 10977

[21] Appl. No.: 782,373

[22] Filed: Oct. 24, 1991

[51] Int. Cl.$^5$ ............................................. B62H 7/00
[52] U.S. Cl. ................................................ 280/293
[58] Field of Search ................ 280/293, 288.4, 47.34, 280/47.371, 202

[56] References Cited

U.S. PATENT DOCUMENTS

| | | | |
|---|---|---|---|
| 3,130,444 | 4/1964 | Stollsteimer | 280/47.371 |
| 3,485,507 | 12/1969 | Christof | 280/293 |
| 4,917,398 | 4/1990 | de Miranda Pinto | 280/293 |

FOREIGN PATENT DOCUMENTS

| | | | |
|---|---|---|---|
| 2830561 | 1/1980 | Fed. Rep. of Germany | 280/293 |
| 2600963 | 1/1988 | France | 280/293 |

Primary Examiner—Mitchell J. Hill
Attorney, Agent, or Firm—Ostrolenk, Faber, Gerb & Soffen

[57] ABSTRACT

A device for facilitating training youngsters to ride bicycles comprises an elongated tube with a handle on one end and with a clamping mechanism on the other by which the device is clamped rigidly, but detachably, to the bicycle frame. The tube and its handle are pivotable relative to the bicycle frame up, down and sideways, in a manner whereby the height and orientation of the handle relative to the bicycle is adjustable to permit an adult to hold the bicycle upright without having to stoop while running alongside the bicycle while training a youngster to ride the same.

9 Claims, 4 Drawing Sheets

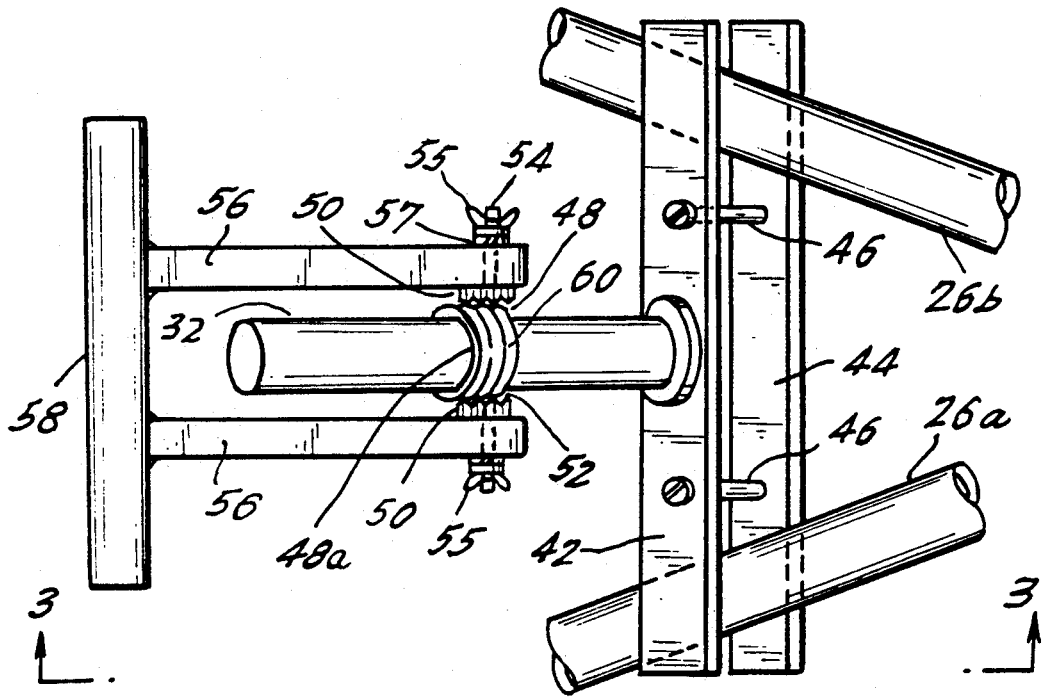
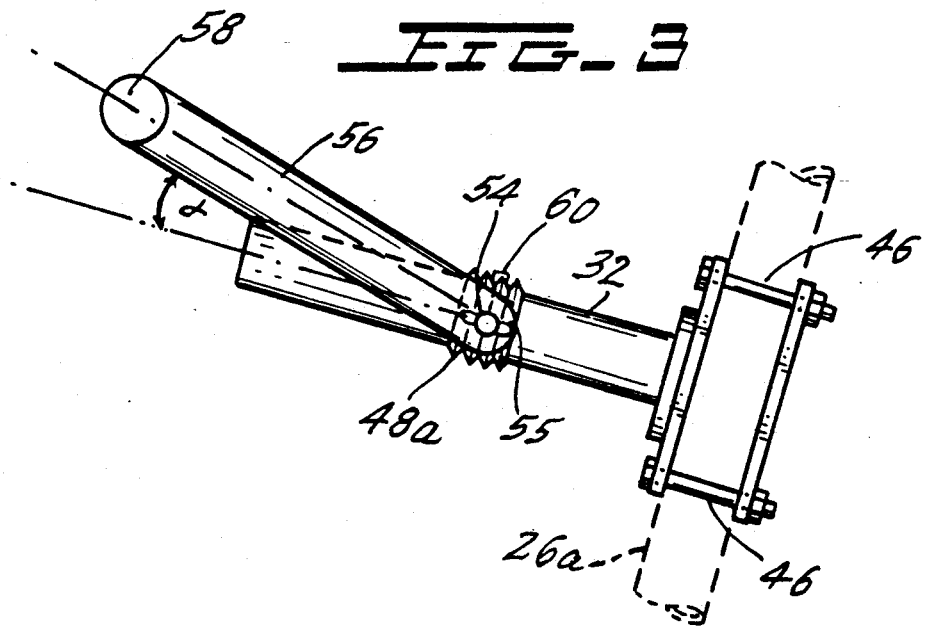

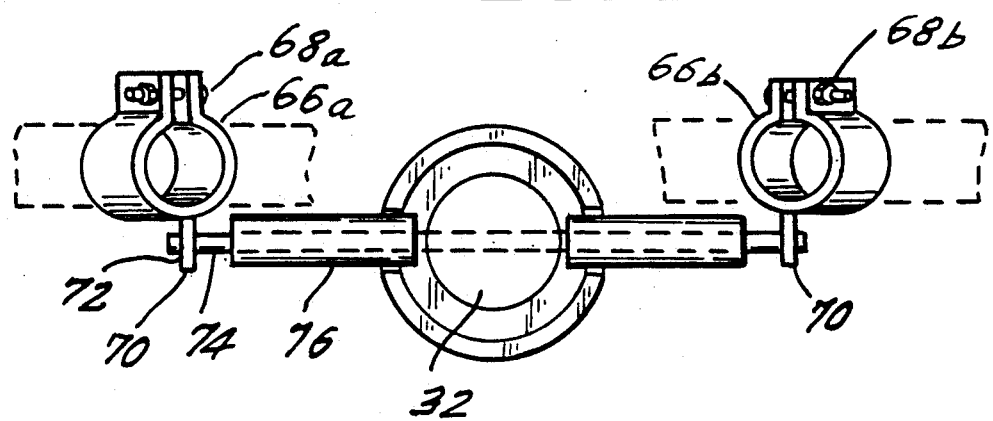
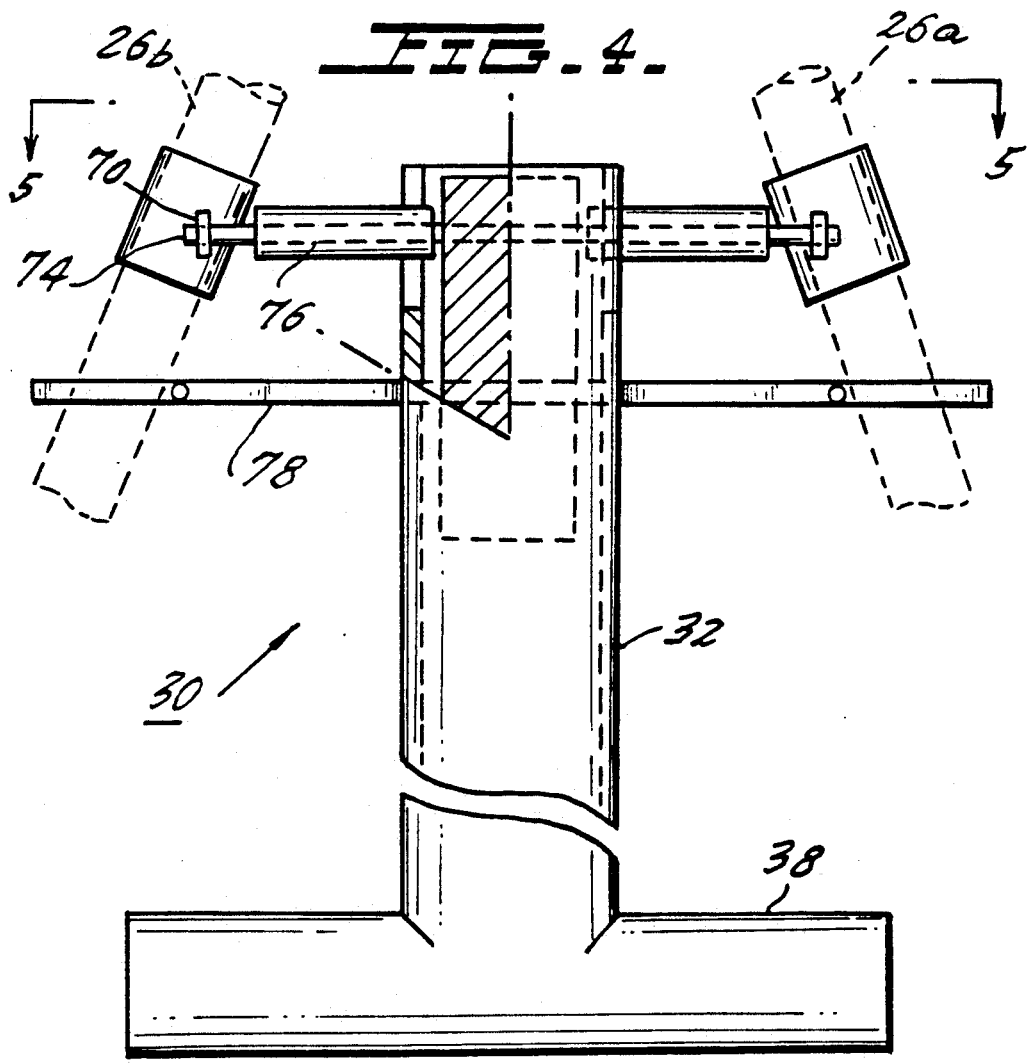

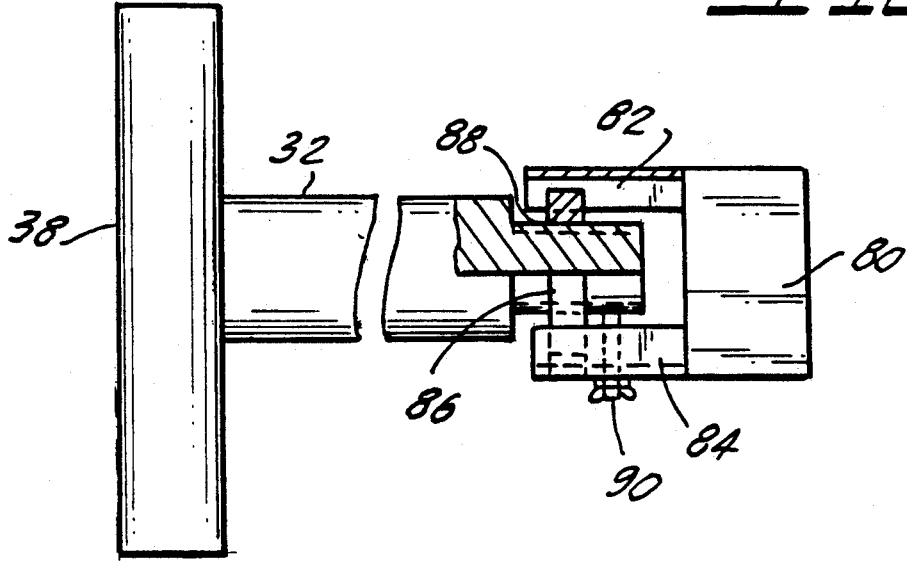
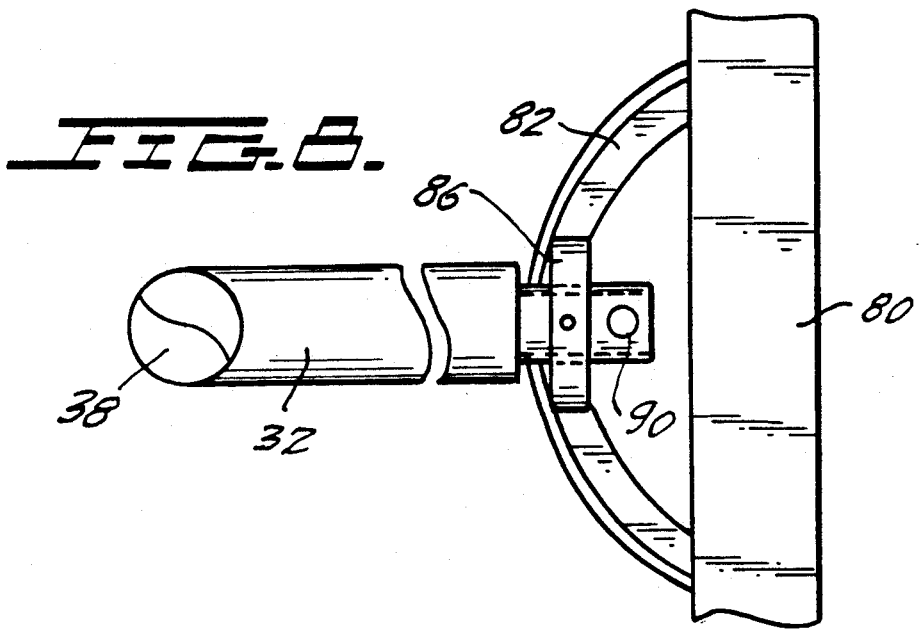
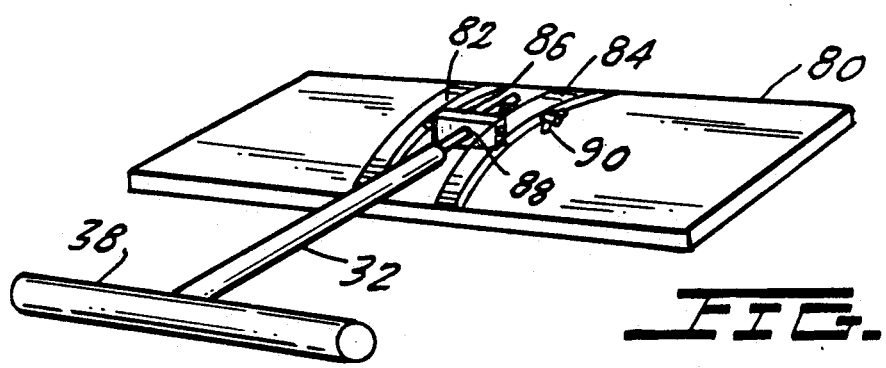

DEVICE FOR FACILITATING TEACHING YOUNGSTERS TO RIDE BICYCLES

BACKGROUND OF THE INVENTION

The present invention is directed to a device for facilitating training youngsters to ride bicycles.

Virtually every child goes through the stage when he or she learns to ride a bicycle. A minority of children have the inborn ability to teach themselves to ride a bicycle without help from an adult. They do so, for example, by first practicing with training wheels and then graduating to riding without training wheels, typically after several trials and a number of good falls.

In the vast majority of cases, however, the learning process involves an adult, such as a parent, a relative or a friend. This requires the adult to stoop low and uncomfortably while holding and running alongside the child's bicycle until the child develops the ability and confidence to ride alone.

The need to bend over and to contort one's body while holding and running alongside the bicycle makes teaching bicycle riding unduly difficult as well as unpleasant for some adults.

SUMMARY OF THE INVENTION

Accordingly, it is an object of the present invention to provide a device which facilitates training a youngster to ride a bicycle.

Another object of the present invention is to provide a bicycle riding training device which can be easily attached to and detached from a conventional bicycle.

It is a further object of the present invention to provide a bicycle riding training device which is simple to construct and inexpensive to manufacture.

It is yet another object of the invention to provide a bicycle riding training device which is attachable to a bicycle and which can be adjusted to fit a holding height preferred by the adult using it.

A further object of the invention is to provide a bicycle riding training device which is structured to accommodate a person's preference to run alongside the left or right side of the bicycle.

The foregoing and other objects of the invention are realized in accordance with the present invention with a simple device that can be easily secured to the bicycle frame and which provides a handle for holding the bicycle balanced while training a youngster to ride it. In its simplest form, the device comprises an elongated tube with a handle at one end and a clamp on the other end, the clamp being attachable to the bicycle frame, preferably to the rear wheel fork which extends from beneath the bicycle seat to the hub of the rear wheel.

The clamp may be constructed as a pair of clamping plates interconnected by one or more bolts which serve to pull the plates together while a frame part of the bicycle, e.g. the rear wheel fork, is disposed therebetween. Tightening the bolts results in the device of the present invention being secured to the bicycle.

In accordance with one embodiment of the invention, the handle is constructed to pivot and rotate relative to the bicycle frame part. In accordance with another embodiment, the handle is pivotable and rotatable relative to the elongated tube portion.

Instead of clamping plates, the clamping mechanism may comprise a pair of sleeves that are structured to slip around the two rods which define the fork for the rear wheels. Each sleeve has an integrally formed lug with an opening which receives the terminal end of a transverse bar in which the elongate tube extending from the handle is threadedly or rigidly secured. With the foregoing embodiment, the handle is both rotatable about the axis of the elongate tube and also pivotable in the vertical plane.

In accordance with yet another embodiment, the distal end of the elongate tube is pivotably supported between a pair of side walls, which side walls are in turn located on the more proximate clamping plate of the clamping mechanism. The side walls may be arch-shaped. A pivotably mounted platform which extends between the side walls has a threaded opening in which the elongate tube is rotatably mounted. The foregoing construction permits the handle to pivot in a vertical plane. The angular position of the tube and hence the height of the handle may be fixed by loosening and then tightening a fixing screw extending through one of the side walls and engaging the elongate tube.

In accordance with a still further embodiment, the distal end of the elongate tube is integrally connected with or is otherwise mounted to a swivel ball which swivel ball is in turn supported between a pair of clamping plates the more proximate of which has an opening for the elongate tube to extend therethrough. With this embodiment, the handle is universally pivotable up, down as well as sideways, enabling positioning of the handle to the right or to the left relative to the bicycle and adjusting the height of the handle relative to the ground.

In another variant of the present invention, the elongate tube is telescopically extendable and the handle of the device is structured to be rotatable relative to the axis of the elongate tube. The clamping mechanism may have an adjustable configuration so that it may be secured to different bicycle models. For example, the device may be constructed with means to secure it to the tube projecting below the bicycle seat. Alternatively, the clamping mechanism may be designed to provide a connection to the mid-section of the bicycle frame.

Other features and advantages of the present invention will become apparent from the following description of the invention which refers to the accompanying drawings.

BRIEF DESCRIPTION OF THE DRAWINGS

FIG. 2 is a top view of a second embodiment of the device of the present invention;

FIG. 4 is a top view of a third embodiment of the invention;

FIG. 5 is a view of the embodiment of FIG. 4 as seen along lines of 5—5;

FIG. 6 is a perspective of a fourth embodiment of the present invention;

FIG. 7 is a top view of the embodiment of FIG. 6;

FIG. 8 is a view of the embodiment of FIG. 6 along lines 8—8; and

FIG. 9 is a cross-section through a fifth embodiment of the present invention.

DETAILED DESCRIPTION OF THE DRAWINGS

Figure 1:
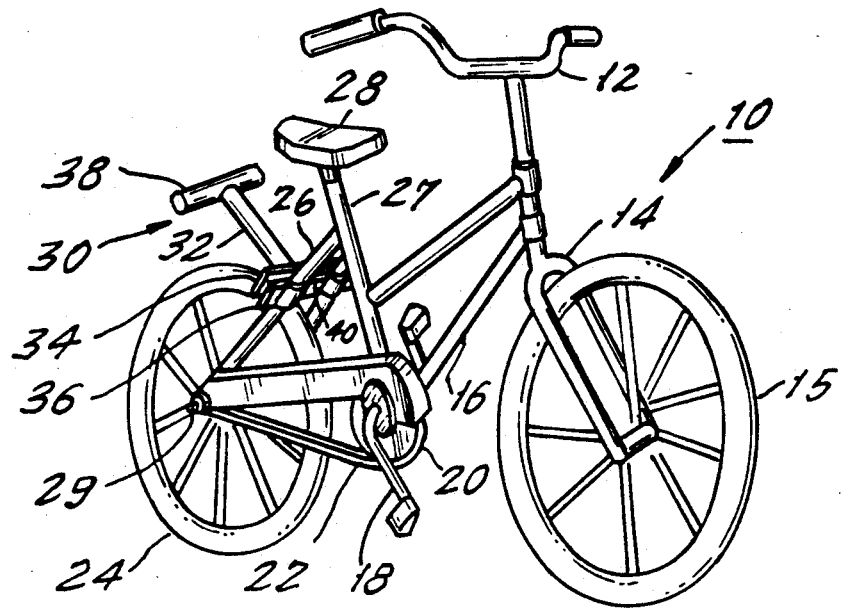
FIG. 1 illustrates a conventional bicycle with a first embodiment of the device of the present invention attached thereto.

FIG. 1 illustrates a conventional bicycle 10 with standard parts including a handlebar 12, a front wheel fork 14 for supporting the front wheel 15, a frame 16, pedals 18, and a chain sprocket 20 with a chain 22 for driving the rear wheel 24.

The conventional bicycle 10 further includes, in the area adjacent the seat 28, a rear wheel fork 26 which typically extends at an angle relative to the vertical, from the seat supporting tube 27 to the hub 29 of the rear wheel 24.

The training device 30 of the present invention is attachable to the rear wheel fork 26 and includes, in accordance with a first embodiment thereof, an elongate tube 32 which is designed to be attached to or detached from the bicycle 10 with the aid of a clamping mechanism including the clamping plates 34 and 36. The first clamping plate 34 is placed at the rear side of the fork 26 and the second clamping plate 36 on the front side of the fork 26, in a manner enabling one or more bolts 40 to pull the plates 34 and 36 together to thereby firmly grip the rear fork 26 therebetween. The elongate tube 32 extends generally at angle to rear upward and relative to the bicycle 10. Thereby, an adult standing upright may comfortably hold and balance the bicycle 10 while holding onto the handle 38.

Note that the term "tube", as in "elongate tube 32", may comprise and is meant to include any structural strut or the like, including without limitation, solid or hollow members without regard to cross-sectional shape which may be round, square, rectangular, etc.

Figure 3:
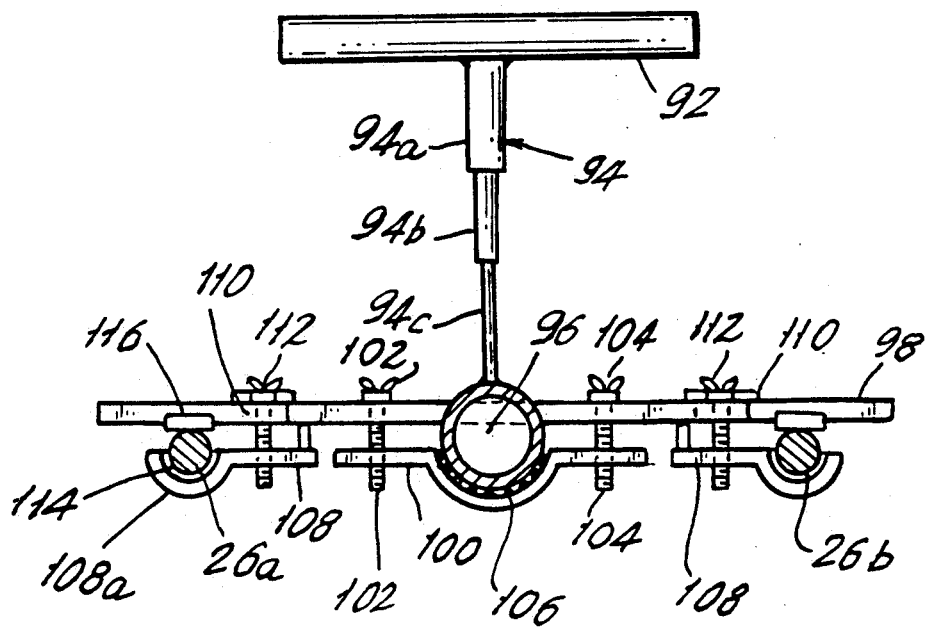
FIG. 3 is a view of FIG. 2 along lines 3—3.

In accordance with a second embodiment shown in FIGS. 2 and 3, the elongate tube 32 is rigidly secured to a first clamping plate 42 which can be placed against one side of the tubular rods 26a and 26b comprising the rear wheel fork 26. A second clamping plate 44 is located on the other side of the tubes 26a and 26b, the bolts 46 serving to pull the plates 42 and 44 together to firmly secure the device of the present invention to the bicycle 10, essentially in the same manner as in FIG. 1. The embodiment of FIGS. 2 and 3 differs from FIG. 1 in that the tube 32 includes a grooved portion 48 which is configured to engage washers 50 having coarse faces 52 for engaging the grooved surface 48. Side bars 56 projecting from a handle grip 58 are secured to the tube 32 with the through-going hinge pin 54. Consequently, the height of the handle grip 58 is adjustable by changing the size of the angle α (FIG. 3). The wing nuts 55 acting through spring washers 57 may be tightened to fix the orientation of the side bars 56 relative to the tube 32 and thus the height of the handle grip 58.

Optionally, the grooved portion 48 on tube 32 may be formed as a ring 48a that is movable axially along the tube 32, the position of the ring 48a on the tube 32 being capable of being fixed by tightening the set screw 60. This construction makes it possible to adjust the effective length of the training device of the present invention, as well as the angular orientation of the handle grip 58, as by turning the ring 48a. In an embodiment using the ring 48a, quite obviously the pin 54 extends only to the ring 48a to which it may be pivotably attached (not shown).

In accordance with FIGS. 4 and 5, which show a third embodiment of the present invention, the means for attaching the training device of the present invention to the rods 26a and 26b comprises a pair of sleeves 66a and 66b which are designed to be respectively slipped and rigidly secured to the fork rods 26a and 26b upon tightening of the bolts 68a and 68b. Firmly (and preferably integrally) attached to each of the sleeves 66a and 66b is a respective lug 70 having a hinge orifice 72 for receiving an extension 74 of the crossbar 76. The tube 32 is connected to, for example, by a threaded connection, to the crossbar 76. The embodiment of FIGS. 4 and 5 permits the training device of the present invention to pivot up and down via the pivoting connection provided at the lugs 70.

A strut 78 (FIG. 4) may optionally be connected to the frame parts 26a and 26b to provide a stop for the tube 32, preventing the same from falling on and rubbing against the rear wheel 24.

A still further embodiment of the invention (FIGS. 6-8) provides a first clamping plate 80 (corresponding to the plate 42 in FIG. 2) which can be affixed to the ribs 26a and 26b of the bicycle 10, for example, via the means disclosed previously in connection with the preceding embodiments. The plate 80 supports first and second arch-shaped sidewalls 82 and 84 that are spacedly juxtaposed so as to rotatably support therebetween a horizontally disposed tube holding bar 86 having a threaded opening 88 in which the tube 32 is threadedly secured. This embodiment permits unscrewing of the handle portion of the device (comprising the tube 32 and handle 38), facilitating attachment and detachment of the training device. A set screw 90 may be provided to fix the rotational orientation of the handle 38.

In accordance with a still further embodiment of the present invention, FIG. 9 illustrates a handle grip 92 attached to a tube 94 which is comprised of several telescopically interengaged portions 94a, 94b and 94c, providing an extendable tube 32 whose length is adjustable as desired. The lowermost tube portion 94c is rigidly attached to a swivel ball 96 which is disposed between a first clamping plate 98 and a swivel ball lock plate 100 that can be pulled tight against the swivel ball 96 by tightening the bolts 102 and 104. The surface 106 of the swivel ball 96 facing the lock plate 100 may be comparatively rougher to provide for increased friction and improved holding of the position of the swivel ball 96. The bolts 102 and 104 may be threadedly received in threaded openings in the lock plate 100 and the bolts 102 and 104 may further be provided with more easily turned wing-shaped heads.

To secure the device of FIG. 9 to the bicycle 10, this embodiment provides a pair of clamping plates 108, each having an arcuate portion 108a for gripping the ribs 26a and 26b as shown. The openings 110 for the bolts 112 (which hold the clamps 108) may be slotted as shown to permit moving the plates 108 to the left or to the right, so as to accommodate different sized spacings between the ribs 26a and 26b in different bicycle models.

The constituent parts in all the aforementioned embodiments may be formed of plastic so as to avoid chipping or harming painted finish on the bicycle 10. If the parts are constructed of metal, soft paddings 114 and 116 on the clamping surfaces of the elements 98 and 108 may advantageously be provided to protect the bicycle.

Thus, as described above, the present invention achieves the aim of providing a training device which can be easily attached to and detached from a conventional bicycle and further providing a handle which enables one to hold a bicycle balanced without having to stoop low over a children's bicycle. The training device of the present invention can be adjusted lengthwise, rotated to orient the handle to suit one's preferences, and/or positioned to the right or the left of the bicycle. Further, while the foregoing embodiments have shown the training device with hardware designed to attach the same to the rear wheel fork 26, the inventors herein contemplate that the device can be easily provided with means to effect a connection to other portions of the bicycle frame, for example, to the tubular member 27 to which the seat 28 is attached or to other frame parts. It is also within the ambit of the present invention to provide two or more independent clamping points to the bicycle (not shown) to prevent accidental detachment of the device during use.

Besides its obvious utilitarian aspects, the present invention has the benefit of enabling the adult to hold the bicycle better balanced than possible when holding the bicycle at its seat while standing to the side thereof as in the prior art. Moreover, the adult's standing well behind and unseen by the child will have a positive psychological impact on the child which the inventors herein believe will reduce the time required to learn to ride a bicycle.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A training device for holding a bicycle, the device comprising:

an elongate tube;
   a handle disposed adjacent a first end of the elongate tube; and
   securing means attached adjacent a second end of the elongate tube and structured for securedly attaching the elongate tube to a bicycle frame part, the securing means comprising first and second plates structured for enabling placing the bicycle frame part therebetween and including tightening means effective for tightly pulling the plates toward each other.

2. The device of claim 1, wherein the bicycle frame part is a rear wheel fork.

3. The device of claim 1, further comprising pivoting means effective for enabling the handle to pivot relative to the bicycle frame part.

4. The device of claim 1, including means for enabling pivoting of the handle relative to the elongate tube.

5. The device of claim 1, including means for enabling moving of the handle longitudinally relative to the elongate tube.

6. The device of claim 1, the securing means comprising a swivel ball and the elongate tube being attached to the swivel ball.

7. The device of claim 6, the second plate having an opening through which the elongate tube protrudes with the swivel ball disposed in contact with an undersurface of the second plate, and the first plate engageable with the swivel ball.

8. The device of claim 6, wherein the handle tube is extendable.

9. The device of claim 1, wherein the handle is rotatable about an axis of the elongate tube.

* * * * *